(12) United States Patent
Gupta et al.

(10) Patent No.: US 8,422,754 B2
(45) Date of Patent: Apr. 16, 2013

(54) MEDICAL IMAGING SYSTEM

(75) Inventors: Vipin Gupta, Bangalore (IN); Amit Kale, Bangalore (IN); Hari Sundar, Piscataway, NJ (US)

(73) Assignee: Siemens Aktiengesellschaft, München (DE)

( * ) Notice: Subject to any disclaimer, the term of this patent is extended or adjusted under 35 U.S.C. 154(b) by 242 days.

(21) Appl. No.: 13/027,343

(22) Filed: Feb. 15, 2011

(65) Prior Publication Data

US 2012/0207377 A1    Aug. 16, 2012

(51) Int. Cl.
*G06K 9/00*    (2006.01)
(52) U.S. Cl.
USPC ......................................................... 382/128
(58) Field of Classification Search .......... 382/128–134; 128/920–925; 356/39–49; 600/407–414, 600/424–426; 345/581–618
See application file for complete search history.

(56) References Cited

PUBLICATIONS

Denis Che Keung Fan, :Bayesian Inference of vascular Structure from Retinal Images, May 2006, pp. i-xix, Thesis, University of Warwick, Department of Computer Science.
Schneider et al., "Automatic Global Vessel Segmentation and Catheter Removal Using Local Geometry Information and Vector Field Integration", 2010, pp. 45-46, IEEE. NL.
Sadegnzadeh et al., "Detection of Retinal Blood vessels Using Complex Wavelet Tgransforms and Random Forest classification", 2010, pp. 1-5, Imaging Science and Biomedical Engineering School of Cancer and Enabling Sciences, The University of Manchester, UK.

*Primary Examiner* — Atiba O Fitzpatrick

(57) ABSTRACT

A medical imaging system for processing an original medical image is provided. The system includes a seed generator for receiving the original medical image representing an original blood vessel and to generate coarse seeds on a basis of vesselness feature in respect to every pixel of the original blood vessel represented by the medical image, and a seed processor for receiving the coarse seeds and for processing the coarse seeds to select a set of refined seeds on a basis of the regression profile for each of the coarse seed by using random forest classification, such that the set of refined seeds are selected from the coarse seeds such that the set of refined seeds adapted to lie on a corrected blood vessel.

18 Claims, 2 Drawing Sheets

MEDICAL IMAGING SYSTEM

FIELD OF INVENTION

The field of invention relates to a medical imaging system for processing an original medical image. More particularly, the invention relates to the medical imaging system for segmenting the blood vessels represented by the medical image.

BACKGROUND OF INVENTION

Medical images represent various parts of the human body like blood vessels, bones, etc. By analyzing the medical images clinicians can plan treatment for the patients and at the same time, the clinicians can be guided to operate the body part while operating over the body part, for example catheter guidance, image guidance for the surgery. The medical images for surgery guidance are analyzed by registering the medical image with pre-operative 3D medical data. During the registration, the blood vessels represented by the medical images are used as features, which further requires segmentation of the blood vessels in real-time. Currently, segmentation of the blood vessels is done manually by clinicians which involves manual input of multiple points along the blood vessel direction to get blood vessel parameters like diameter and stenoses detection. Such manual segmentations have reduced efficiency of clinicians, mis-detection of blood vessels, etc. Manual segmentation is slow and prone to human errors, thus automatic segmentation of the blood vessels is desired.

One probable way is disclosed by Matthias Schneider and Hari Sundar in "Automatic global vessel segmentation and catheter removal using local geometry information and vector field integration", where local probability map is combined with local directional vessel information to result into global vessel segmentation, where the segmentation is represented as a set of discrete streamlines populating the vascular structures and providing additional connectivity and geometric shape information and the streamlines are computed by numerical integration of the directional vector field that is obtained from eigen analysis of the local Hessian indicating the local vessel direction.

SUMMARY OF THE INVENTION

A medical imaging system for processing an original medical image includes a seed generator adapted to receive the original medical image representing an original blood vessel and to generate coarse seeds on a basis of vesselness feature in respect of every pixel of the medical image, and a seed processor adapted to receive the coarse seeds and adapted to process the coarse seeds to select as set of refined seeds by using random forest classification, wherein the set of refined seeds are selected from the coarse seeds such that the set of refined seeds adapted to lie on the blood vessel.

According to one aspect of the invention, the random forest classification uses at least one of vesselness features, or eigen value feature or effective margin feature or combination thereof, wherein effective margin is based on a histogram of intensity values of the pixels of the medical image and the eigen value for every pixel of the image is generated by processing every pixel using second order derivative of Gaussian kernel.

According to another aspect of the invention, the seed processor is adapted to provide the set of refined seeds to a blood vessel growing device, the system includes the blood vessel growing device adapted to receive the set of refined seeds, to construct a corrected blood vessel and to draw a center line with respect to said corrected blood vessel.

According to yet another aspect of the invention, the system includes a blood vessel pruning device adapted to prune the corrected blood vessel to optimize growth of the corrected blood vessel by generating a regression profile for each point on the centerline of the corrected blood vessel using random forest classification.

BRIEF DESCRIPTION OF THE DRAWINGS

The present invention is further described hereinafter with reference to exemplary embodiments shown in the accompanying drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
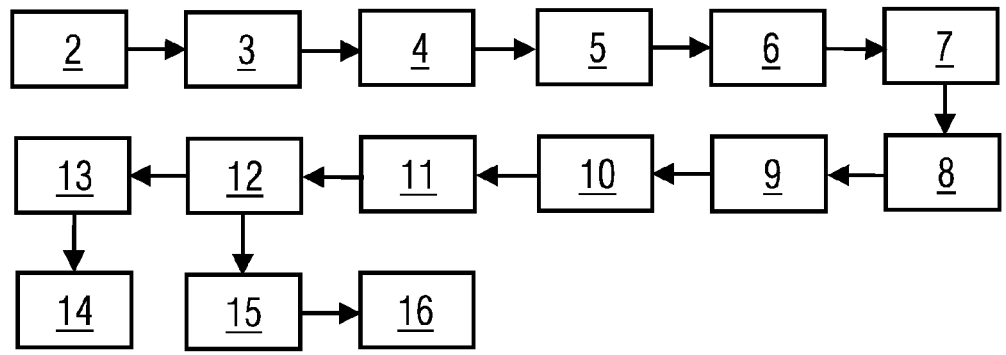
FIG. 1 illustrates a medical imaging system for processing an original medical image.
Figure 2:
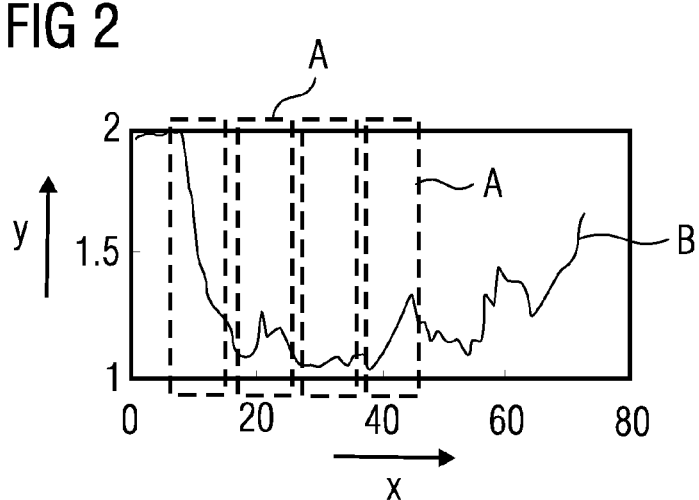
FIG. 2 illustrates a graphical representation of regression profile for points on the centerline of the corrected blood vessel.

To explain an embodiment of the invention, FIG. 1 and FIG. 2 are explained together.

FIG. 1 illustrates a medical imaging system 1 including a seed generator 3, a seed processor 5, a blood vessel growing device 7, a blood vessel pruning device 9, a blood vessel segregator 11, a color marker 15 and a lumen extraction device 13 cooperatively functioning to process an original medical image 2 for segregating original blood vessels represented by the original medical image 2.

According to FIG. 1, the seed generator 3 receives the original medical image 2 representing an original blood vessel and generates coarse seeds 4 on a basis of vesselness feature in respect to every pixel of the medical image 2. The coarse seeds 4 are points which are most likely to occur on the original vessel. The selection of pixels which qualify to be coarse seeds 4 depends on identifying vesselness feature which corresponds to tubular structure of the blood vessel.

According to FIG. 1, the coarse seeds 4 are quite large in number, so as to detect more and more original blood vessels in the medical image 2. The seed generator 3 identifies pixels for generating coarse seeds 4 which lie on the original blood vessels, irrespective of appearance viz, whether any particular original blood vessel is strong or weak. The coarse seeds also represent some body parts also. To be more accurate, the coarse seeds 4 are not further processed to reduce in numbers, so that the medical imaging system 1 should not result into false positives.

According to FIG. 1, to control the false positives, the coarse seeds 4 are further processed by the seed processor 5 which receives the coarse seeds 4 from the seed generator 3 and processes the coarse seeds 4 to select a set of refined seeds 6 by using random forest classification, wherein the set of refined seeds 6 are selected from the coarse seeds 4 such that the set of refined seeds 6 lies on the original blood vessel. The refined seed 6 more accurately represents the original blood vessel.

According to FIG. 1, the random forest classification is a learning based pattern classification approach. For classification, the random forest classification at least uses one of vesselness features, or eigen value feature or effective margin feature or combination thereof. Alternatively, the random forest classification can use any other features which define the vessels like length of the vessel, intensity of pixels lying on the vessel, etc.

According to FIG. 1, the effective margin feature is based on a histogram based on intensity values of the pixels of the medical image 2 and the eigen value for every pixel of the image 2 is generated by processing every pixel using second order derivative of Gaussian kernel. While analyzing the histogram of intensity values, in case of shadows due to various body organs, the histogram is nearly bimodal with two nearly equal peaks, for non vessel area in the original medical image 2 the histogram is flat, whereas for original blood vessels the histogram is bimodal with two unequal peaks.

According to FIG. 1, on convolution of the medical image 2 with partial second order derivative of Gaussian kernel, an Hessian Egien system is generated. The Hessian Eigen system has following characteristics:
  small curvature along tube direction
  large curvature along perpendicular direction
This translates to small value of first eigen value $\lambda 1$ and first eigenvector v1 in the direction of the tubular structure and larger value of second eigen value $\lambda 2$ with the eigenvector perpendicular to the tubular structure. The eigen values together represents the eigen value feature.

According to FIG. 1, the seed processor 5 is adapted to provide the set of refined seeds 6 to a blood vessel growing device 7. On receiving the set of refined seeds 6, the blood vessel growing device 7 constructs a corrected blood vessel 8 with respect to the original blood vessel and draws a center line with respect to said corrected blood vessel 8. For each point on the centerline of the corrected blood vessel 8, the blood vessel pruning device 9 gives a regression value and the regression values for every point of the centerline represents a regression profile 10 of the corrected blood vessel 8. In an alternate embodiment, for generating the regression profile 10, the random forest classification uses the vesselness feature.

While discussing FIG. 2 references will be made to FIG. 1. According to FIG. 2, a graphical representation of regression profile 10 for the corrected blood vessel 8 is provided; wherein the x-axis represent a chronological order of every point of the centerline according to there occurrence onto the corrected blood vessel 8 and the y-axis represents a regression value for every point of the centerline. A curve B is drawn on a basis of markings between x-axis and y-axis which represent the regression profile 10 for the corrected blood vessel 8. To study the regression profile 10, a small movable window A is overlapped on the graph and parallel to the x-axis to study the regression profile 10 for a selected region of the corrected blood vessel 8. And on the basis part of regression profile 10 represented on curve A for the selected region, the seed processor 5 determines whether the area on the corrected blood vessel 8 belongs to the original blood vessel or not.

According to FIG. 1, to analyze individual blood vessels 12, the corrected blood vessels 8 are segregated using a blood vessel segregator 11 to extract individual blood vessels 12. For further analysis of each individual blood vessel 12, a lumen extraction device 13 extracts lumen 14 for each of the individual blood vessels 12 and measures diameter of each lumen 14.

According to FIG. 1, for a better clarity and differential analysis for each of the individual blood vessels 12, a color marker 15 is used to color code the individual blood vessels 12 to provide color coded vessels 16.

The seed generator 3, the seed processor 5, the blood vessel growing device 7, the blood vessel pruning device 9, the blood vessel segregator 11, the color marker 15 and the lumen extraction device 13 can be general purpose computer processing units which are adapted to perform the functions as explained in FIG. 1 by each of them respectively. In an embodiment, the seed generator 3, or the seed processor 5, or the blood vessel growing device 7, or the blood vessel pruning device 9, or the blood vessel segregator 11, or the color marker 15, or the lumen extraction device 13 or combination thereof can be a part of one processor as different modules of the processor.

Figure 3:
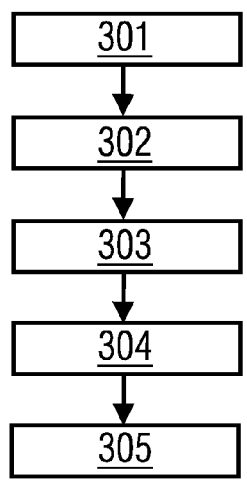
FIG. 3 illustrates a flowchart for multistage random forest classification applied on coarse seeds.

In an alternate embodiment, the coarse seeds are processed by the random forest classification in multiple stages by using vesselness features, eigen value feature and the effective margin feature one by one, which is illustrated by a flow chart using FIG. 3. In step 301, regression profile of each of the coarse seed is generated using the vesselness feature by the random forest classification to provide a first set of partially refined seeds. In step 302, the first set of partially refined seed is sorted out to provide a second set of partially refined seeds. In step 303, the partially refined seeds from the second set of partially refined seeds are either rejected or accepted using the vesselness feature by the random forest classification to provide a third set of partially refined seeds. In step 304, the partially refined seeds from the third set of partially refined seeds are either rejected or accepted using the effective margin feature by the random forest classification to provide a fourth set of partially refined seeds. In step 305, the partially refined seeds from the fourth set of partially refined seeds are either rejected or accepted using the eigen value feature by the random forest classification to provide the set of completely refined seeds.

Figure 4:
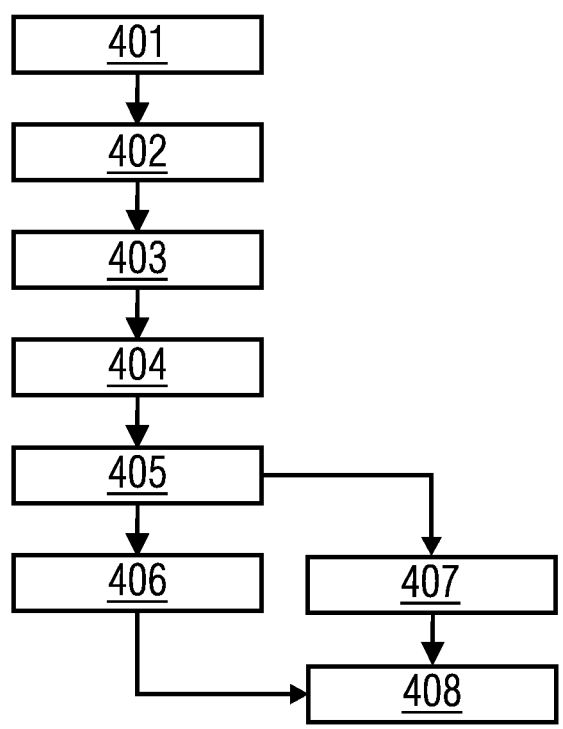
FIG. 4 illustrates a flowchart for a method for processing an original medical image.

FIG. 4 illustrates a flow chart for a method for processing a original medical image representing an original blood vessel. According to step 401, a seed generator receives the original medical image and generates coarse seeds on a basis of vesselness feature in respect to every pixel of the original blood vessel represented by the medical image. In step 402, a seed processor receives the coarse seeds and processes the coarse seeds to select a set of refined seeds on a basis of the regression profile for each of the coarse seed by using random forest classification, wherein the set of refined seeds are selected from the coarse seeds such that the set of refined seeds adapted to lie on a corrected blood vessel. In step 403, a blood vessel growing device receives the set of refined seeds, constructs a corrected blood vessel with respect to the original blood vessel and draws a center line with respect to said corrected blood vessel. In step 404, the corrected blood vessels are pruned using a blood vessel pruning device vessel to optimize growth of the corrected blood vessel by generating a regression profile for each point on the centerline of the corrected blood vessel using random forest classification. In step 405, a blood vessel segregator receives the corrected blood vessels and segregates the corrected blood vessels to extract individual blood vessels. In step 406, lumens are extracted for each of the individual vessels. The method ends at step 408.

What is claimed is:

1. A medical imaging system for processing an original medical image, comprising:
   a seed generator adapted to receive the original medical image representing an original blood vessel and to generate coarse seeds based on vesselness features in respect to pixels of the original blood vessel; and
   a seed processor adapted to receive the coarse seeds and to process the coarse seeds to select a set of refined seeds by a random forest classification,
   wherein the set of refined seeds are selected from the coarse seeds such that the set of refined seeds adapted to lie on a corrected blood vessel.

2. The system according to claim 1,
   wherein the random forest classification uses at least one of the vesselness features, or an eigen value feature for every pixel of the original medical image feature, or an effective margin feature, or combinations thereof,
   wherein the eigen value feature is generated by processing the every pixel using a second order derivative of Gaussian kernel, and
   wherein the effective margin feature is generated based on a histogram of intensity values of the pixels of the original medical image.

3. The system according to claim 2, wherein the coarse seeds are processed in multiple stages by the random forests classification built over the vesselness features, the eigen value feature, and the effective margin feature.

4. The system according to claim 1, further comprising a blood vessel growing device adapted to receive the set of refined seeds, to construct a corrected blood vessel with respect to the original blood vessel and to draw a center line with respect to the corrected blood vessel.

5. The system according to claim 4, further comprising a blood vessel pruning device adapted to prune the corrected blood vessel to optimize growth of the corrected blood vessel by generating a regression profile for each point on the centerline of the corrected blood vessel using the random forest classification.

6. The system according to claim 5, wherein the random forest classification uses the vesselness features.

7. The system according to claim 5, further comprising a blood vessel segregator adapted to receive the corrected blood vessels after being pruned from the blood vessel pruning device and to segregate the corrected blood vessels to extract individual blood vessels.

8. The system according to claim 7, further comprising a lumen extraction device adapted to extract a lumen for each of the individual blood vessels.

9. The system according to claim 7, further comprising a color marker adapted to color code each of the individual blood vessels based on a factor assigned to each of the individual blood vessels to provide color coded blood vessels.

10. A method for processing an original medical image, comprising:
    receiving and processing the original medical image representing an original blood vessel to generate coarse seeds by a seed generator based on vesselness features in respect to pixels of the original blood vessel, and
    receiving and processing the coarse seeds to select a set of refined seeds by a random forest classification,
    wherein the set of refined seeds are selected from the coarse seeds such that the set of refined seeds adapted to lie on a corrected blood vessel.

11. The method according to claim 10,
    wherein the random forest classification uses at least one of the vesselness features, or an eigen value feature for every pixel of the original medical image, or an effective margin feature, or combinations thereof,
    wherein the eigen value feature is generated by processing the every pixel using a second order derivative of Gaussian kernel, and
    wherein the effective margin feature is generated based on a histogram of intensity values of the pixels of the original medical image.

12. The method according to claim 11, wherein the coarse seeds are processed by the random forest classification in multiple stages by using the vesselness features, the eigen value feature, and the effective margin feature one by one.

13. The method according to claim 10, further comprising:
    providing the set of refined seeds to a blood vessel growing device by the seed processor,
    constructing a corrected blood vessel with respect to the original blood vessel by the blood vessel growing device, and
    drawing a center line with respect to the corrected blood vessel by the blood vessel growing device.

14. The method according to claim 13, further comprising pruning the corrected blood vessel to optimize a growth of the corrected blood vessel by generating a regression profile for each point on the centerline of the corrected blood vessel using the random forest classification.

15. The method according to claim 14, wherein the random forest classification uses the vesselness features.

16. The method according to claim 14, further comprising:
    receiving the corrected blood vessels after being pruned by a blood vessel segregator from the blood vessel pruning device, and
    segregating the corrected blood vessels by the blood vessel segregator to extract individual blood vessels.

17. The method according to claim 16, further comprising color coding each of the individual blood vessels based on a factor assigned to each of the individual blood vessels to provide color coded blood vessels by a color marker.

18. The method according to claim 16, further comprising extracting a lumen for each of the individual blood vessels.

* * * * *